United States Patent [19]

Crowe

[11] 3,827,498
[45] Aug. 6, 1974

[54] FLUID LOSS ADDITIVE
[75] Inventor: Curtis W. Crowe, Tulsa, Okla.
[73] Assignee: The Dow Chemical Company, Midland, Mich.
[22] Filed: May 1, 1972
[21] Appl. No.: 249,085

Related U.S. Application Data
[63] Continuation-in-part of Ser. No. 177,680, Sept. 3, 1971, abandoned.

[52] U.S. Cl................ 166/282, 166/283, 166/295
[51] Int. Cl....................... E21b 43/22, E21b 43/26
[58] Field of Search ............ 166/282, 283, 295, 307

[56] References Cited
UNITED STATES PATENTS

| | | | |
|---|---|---|---|
| 2,896,717 | 7/1959 | Howard | 166/295 |
| 3,123,158 | 3/1964 | Gallus | 166/295 |
| 3,302,719 | 2/1967 | Fischer | 166/295 |
| 3,316,965 | 5/1967 | Watanabe | 166/295 |
| 3,319,716 | 5/1967 | Duncan | 166/282 |
| 3,711,405 | 1/1973 | Pye et al. | 166/282 |

Primary Examiner—Stephen J. Novosad
Assistant Examiner—Jack E. Ebel
Attorney, Agent, or Firm—William M. Yates

[57] ABSTRACT

An additive for aqueous fluids including aqueous acid solutions, brines, fracturing fluids, work over fluids, etc., and a method for treating a heterogenous permeable subterranean formation with such an aqueous fluid containing said additive is taught. The additive comprises a mixture of particulate oil soluble resins one being friable and the other pliable.

10 Claims, 2 Drawing Figures

FLUID LOSS ADDITIVE

CROSS REFERENCE TO RELATED APPLICATION

This application is a continuation-in-part of application Ser. No. 177,680, filed Sept. 3, 1971, and now abandoned.

BACKGROUND OF THE INVENTION

The problem of decreasing the permeability of certain portions of a subterranean formation so that certain treatments thereof with aqueous fluids can be made more efficient is well known in the art. For example, when acidizing a heterogenous permeable formation, it is important to contact the less permeable zones with the acid. Many additives, generally known as diverting agents have been developed for this use. Also, when fracturing formations, more efficient treatments can be achieved if the fracturing fluid is not lost to the formation but instead can be further utilized to increase the length and width of the fractures. In these instances fluid loss additives are desirable. There are also other treatments where fluid loss control is desired.

Many materials have been employed as fluid loss control agents, and as diverting agents, e.g., see the teachings of U.S. Pat Nos. 3,319,716; 3,281,354; 3,417,817 and the like. However, the additive of the present invention can be employed as a diverting and/or fluid loss agent and possesses certain advantages not possessed by others. First, it is stable in acid solutions. The additive can be easily removed from the formation by contacting it with a liquid hydrocarbon, e.g., crude oil, thus preventing residual plugging and formation damage. In addition, only a very small quantity of the additive is required in a treatment fluid. Furthermore, the additive can be made so that the particles thereof will pass through gravel packs so as to effectively treat the formation located behind the pack. The present additive is also stable over a broad temperature range.

SUMMARY OF THE INVENTION

The principles of the present invention may be applied to improving hydrocarbon recovery from heterogenous productive zones of underground formations. It may also be applied to generally improving the permeability of subterranean formations for improved fluid flow therethrough.

The additive comprises a mixture of at least two oil soluble particulate resins. One resin remains hard and friable when dispersed in an aqueous medium. The second resin is a material which is soft and pliable when dispersed in an aqueous medium.

Pliable means that a one inch square cube of a specific resin can be compressed by at least about one-tenth its height without producing stress fractures in the cube. Friable means that stress fractures will occur in a 1 inch cube of a specific material when compressed by about one-tenth, or less, of its original height.

The resins may be derived from natural occurring materials, or they may be synthetic, meaning they are prepared from the union of a large number of molecules of one or more compounds, or they are derived from chemically modified natural resins.

The particle size of the friable resin is less than about 300 microns and greater than about 0.5 micron. The particles of the pliable resin range in size from about 0.05 to about 30 microns.

BRIEF DESCRIPTION OF THE DRAWING

The Figures illustrate a plot of the data generated in Example 2.

DETAILED DESCRIPTION OF THE INVENTION

Figure 1:
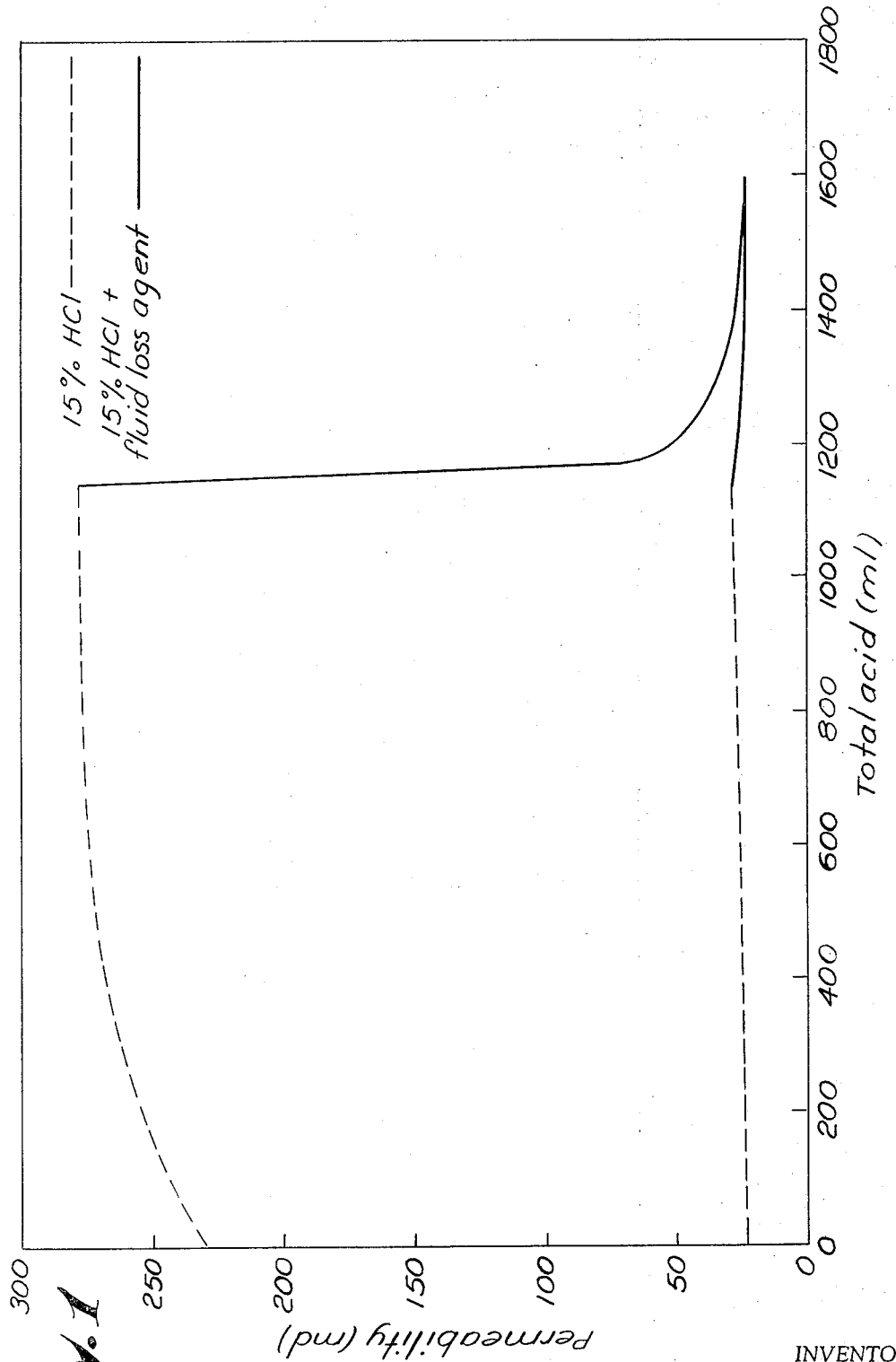

One of the oil soluble resins is friable when dispersed in an aqueous medium. Resins which may be employed having these characteristics include, for example, oil soluble polystyrenes, terpenes, phenolics (substituted in the ortho or para positions), modified alkyl resins, styrene-vinyl toluene copolymers, dimerized rosin acids, esters of dimerized rosin acids, acrylics and other such resins.

The other oil soluble resin is pliable when dispersed in an aqueous medium. Resins which may be employed having these characteristics include, for example, certain latices such as aqueous dispersions of high molecular weight thermoplastic resins such as, for example, ethylene interpolymers (such as sold under the trademark Elvax by E. I. DuPont De Nemours & Co., Inc.), ethylene-vinyl acetate resins, ethylene-vinyl acetate-waxy dispersions, polyisobutylene resin dispersions (such as sold under the trade name Oppanol B Dispersion) and other high molecular weight resins such as ethylene-acrylate resins, ethyl-ethylacrylate resins, ethyl-vinyl acetate, and the like.

The weight proportion of the two resins in the mixture has not been found to be critical. Weight proportions ranging from 20:1 to 1:20 (friable to pliable resin) are operable.

In the use of the fluid loss additive, the ingredients may be added to a treatment fluid separately or they can be premixed, with or without an additional fluid, and employed as needed. For example, to aid in dispersing the oil soluble resins into an aqueous treatment fluid, the mixture can be premixed with a small amount of an alcohol (mono or poly hydric) e.g., glycerol, etc., and/or a surfactant to render the resin mixture water wettable. Likewise, a surfactant may be added to the aqueous treatment fluid or the premix to aid in uniformly dispersing the resin particles into the treatment fluid.

An especially useful embodiment of the invention is a premix formed by dispersing a mixture of such resins into a mono and/or polyhydric alcohol to form a dispersion which is then easily mixed with various treatment fluids. Water, surfactants, anti-foaming agents and the like can also be included in the premix composition.

In plugging permeable portions or zones of a heterogenous permeable formation the ingredients or a premix are added uniformly to an aqueous treatment fluid. The composition of the invention may also be added as a concentrated slug to the aqueous treatment fluid or the formation may be contacted with an aqueous dispersion of the mixture and then with a treatment fluid.

When the mixture is employed as a diverting agent it is provided in a treatment fluid in an amount which is effective to divert at least a portion of the treatment fluid from a more permeable portion of the formation to a less permeable portion. When employed as a diverting agent, for example, acid treatment fluids, the mixture (total amount of both resins) is incorporated into the treatment fluid in an amount of at least one-half pound per 1,000 gallons of treatment fluid. The upper limit is dependent on the efficiency of the particular system being employed. The exact amount employed can, however, be varied over a wide range. It has been discovered that in general greater amounts should be employed as the formation temperature increases.

When employed as a fluid loss additive generally at least about 2 pounds (total weight of both resins) per 1,000 gallons are employed.

In general, a sufficient amount of the resin mixture should be added to the treatment fluid so that the fluid loss of an aqueous dispersion of the mixture through a one inch diameter by 1 inch thick Berea sandstone core (having an initial permeability of from about 50–200 md.) conducted in a high pressure cell at 1,000 psi and 150°F is less than about 25 ml in 25 minutes.

The fluid loss additive is effective at temperatures up to the melting point temperature of the lowest melting resin in the additive.

The additive can be employed in variious aqueous treatment fluids including acidizing fluids, e.g., HCl, HF, hydrobromic, organic acids, etc., aqueous based fracturing fluids, work over fluids, e.g., brine, water, and the like. The aqueous treatment fluid should be substantially free of hydrocarbon solvents, e.g., oils, for the resins employed.

One specific application of the additive is in fluids, e.g., acidizing, which must penetrate a gravel pack to be most effective. In this particular use it is desirable for the treatment fluid and additive to penetrate the gravel pack so that the formation can be effectively treated. The resin particles in the mixture are provided in a sufficiently small size that at least about 75 per cent of the particles pass through the specific gravel pack involved. For example, it has been determined that at least about 75 per cent of particles having a maximum size of about 44 microns will pass through a gravel pack composed of −20 +40 mesh (U.S. Standard Sieve Series) sand.

EXAMPLE I

The efficiency of various resins and resin mixtures was first evaluated by means of fluid loss tests using a Bariod High Pressure-High Temperature test cell modified to accept cores. Tests were carried out by flowing fluids through Berea sandstone cores (200 ml.) having a surface area of 5.35 cm. and a thickness of 2.54 cm. Nitrogen gas at a pressure of 1,000 p.s.i. was used to force the fluid through the cores. The tests were conducted at a temperature of about 150°F. Total fluid flow through the core was recorded at time intervals of 1, 4, 9, 16 and 25 minutes. Efficiency of the diverter was judged on the basis of ability to retard flow. The following Table I shows the effect of various resins and resin combinations upon acid flow through the core. The carrier fluid consisted of 15 percent HCl aqueous solution containing 0.4 percent by weight of hexynol and 0.2 percent of a surfactant.

The pliable resin comprised a high molecular weight ethylene-vinyl acetate aqueous dispersion containing about 50 per cent by weight of solids. The per cent shown in Table I for the pliable resin is the per cent by weight of solids in the dispersion. The particles in the dispersion have a size ranging from about 0.4 to 0.6 micron. The friable resin was a high molecular weight hydrocarbon resin having a maximum particle size of about 40 microns with about 70–77 per cent being smaller than about 2 microns. The results are shown in the following Table I.

TABLE I

| Test No. | Additive—Percent by weight based on total weight of treatment fluid | Fluid Loss Min. | | | | |
|---|---|---|---|---|---|---|
| | | 1 | 4 | 9 | 16 | 25 |
| 1 | None | 100 ml in 20 sec. | | | | |
| 2 | 0.2 pliable resin 0.24 friable | 3.0 | 3.4 | 3.8 | 4.0 | 4.3 |
| 3 | 0.24 friable | 100 | — | — | — | — |
| 4 | 2.4 friable | 87 | — | — | — | — |
| 5 | 0.2 pliable | 100 | — | — | — | — |
| 6 | 2.0 pliable | 63 | 79 | 88 | 96 | — |
| 7 | 0.2 pliable 2.4 friable | 21 | 45 | 69 | 89 | — |
| 8 | 2.0 pliable 0.12 friable | 6 | 13 | 25 | 39 | 72 |
| 9 | 0.2 pliable 0.12 friable | 4.5 | 4.9 | 5.3 | 5.7 | 6.0 |
| 10 | 0.2 pliable 0.36 friable | 2.8 | 3.2 | 3.6 | 3.9 | 4.4 |
| 11 | 0.2 pliable 0.48 friable | 2.5 | 3.0 | 3.4 | 3.8 | 4.2 |

It is shown by these tests, that an obvious synergistic effect is present when both resins are employed. The conbination of resins is much more effective than either resin alone, even when a single resin is used in a much larger quantity. It is also shown that the synergistic effect is present even when the weight ratio of resins is varied over a wide range.

EXAMPLE II

In addition to the fluid loss tests, described in Example I, tests were performed to demonstrate the ability of this invention to equalize flow of acid into zones of widely different permeability.

In these tests, two 1 inch × 3 inch Berea sandstone cores of widely different permeability were acidized simultaneously with 15 per cent hydrochloric acid. The cores were mounted in Hassler sleeves which were connected to an acid reservoir through a common manifold. The acid was forced through the cores by means of 100 p.s.i. nitrogen pressure. Acid was allowed to flow through both cores until steady flow rates were established. The reservoir was then emptied and refilled with 15 per cent hydrochloric acid containing a concentration equivalent to 1 lb. of finely ground friable oil soluble synthetic hydrocarbon resin and 1 quart of a pliable ethylene-vinyl acetate resin dispersion (50 per cent solids) per 1,000 gal. of acid. These resins are fully described in the previous Example I. This acid mixture was then forced through the cores at the same 100 p.s.i. pressure. Flow rates were measured and acid volumes recorded. From this and the previous data using the acid alone, a plot was prepared (FIG. 1) of apparent permeability versus total acid volume. The dotted lines represent flow of 15 per cent hydrochloric acid through the two cores while the solid line represents flow of the same acid containing the diverter of the present invention. The normal flow of acid through the more permeable core is about ten times greater than for the less permeable core. Upon introduction of the acid containing the diverter, the flow rates are quickly equalized. The proportion of acid flowing through the cores during the initial phase of the test was 91 per cent of the acid flowing through the more permeable core while only 9 per cent enters the less permeable core. During the period when the acid-diverter mixture is being used, however, 55 per cent of the acid entered the high permeability core while 45 per cent entered the less permeable core.

Figure 2:
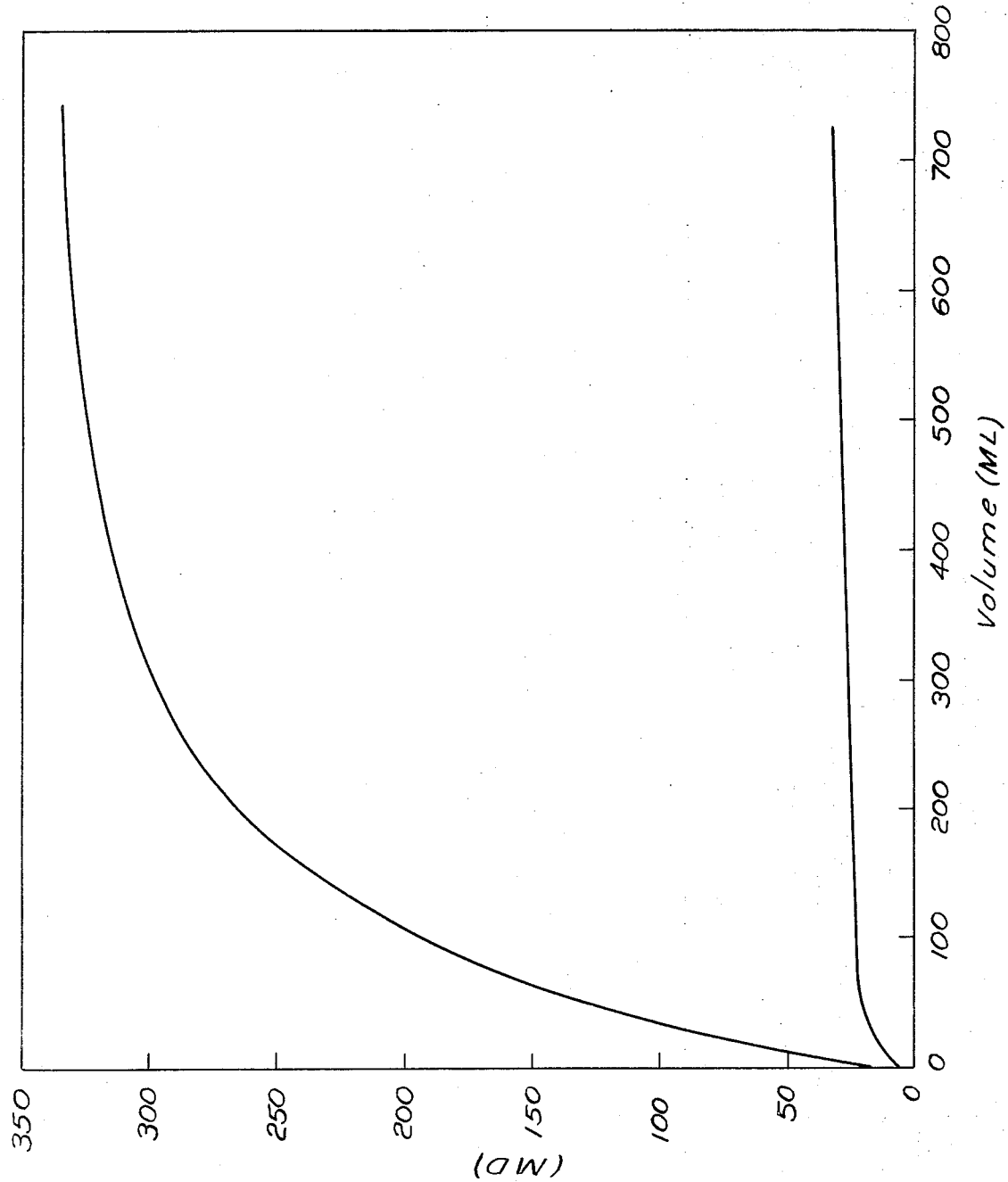

Following the above procedure the ability of the agent to be successfully removed from the formation is illustrated in FIG. 2. After the core had been treated by the above procedure, purified kerosene was run through the plugged cores and as is shown in FIG. 2, the original permeability of the core was restored. Thus no formation damage occurred.

EXAMPLE III

To illustrate the successful clean-up ability of the present invention the following test was run.

A 15 per cent hydrochloric acid was forced through a 1 inch X 3 inch Berea sandstone core, held in a Hassler sleeve, until a constant flow rate was obtained, Injection pressure was 100 p.s.i. and the test temperature was 75°F. Once the initial permeability of the core was determined the same acid containing a certain fluid loss additive was injected under the same test conditions. In each instance the core became almost completely plugged.

Following the above treatment purified kerosene was injected through the core at the same temperature and pressure, until a constant flow rate was stabilized and the permeability of the core was calculated.

Three HCl solutions were tested each containing a different additive. The first contained about 0.2 per cent by weight of hexynol, 0.4 per cent of a pliable resin composed of a high molecular weight ethylene-vinyl acetate resin and 0.24 per cent of a friable hydrocarbon resin. The second HCl dispersion contained the same constituents as the first except that the 0.4 per cent pliable resin was replaced with 0.24 per cent of gum karaya. The third HCl acid dispersion was identical to the first except that the 0.24 per cent friable resin was replaced with 0.24 per cent of finely ground (−325 mesh) silica flour.

In the above test the permeability of the core plugged with the first acid dispersion (practice of the present invention) was restored completely to its original value. The permeability of both of the second and third were restored to less than about 87 per cent of their original value, thus evidencing one of the unexpected properties of the present invention.

What is claimed is:

1. A method for treating a heterogeneous permeable subterranean formation with an aqueous treatment fluid which comprises:

treating said formation with an aqueous treatment fluid containing dispersed therein an effective amount of a heterogeneous mixture of distinct particles consisting essentially of both a first particulate oil soluble resin which is friable and a second particulate oil soluble resin which is pliable, wherein the size of said friable resin particles ranges from about 0.5 to about 300 microns and the size of said pliable resin particles ranges from about 0.05 to about 30 microns.

2. The method as defined in claim 1 where said aqueous treatment fluid is an acidizing fluid.

3. The method as defined in claim 1 wherein said aqueous treatment fluid is a fracturing fluid.

4. The method as defined in claim 1 wherein said aqueous treatment fluid is a workover fluid.

5. The method as defined in claim 1 wherein the total amount of said resins in said aqueous treatment fluid is sufficient to prevent less than about 25 milliliters of fluid loss and said fluid through a one inch diameter by 1 inch thick Berea sandstone core having an initial permeability ranging from about 50 to about 200 md. conducted in a high pressure cell at 100 p.s.i. and 150°F in 25 minutes.

6. The method as defined in claim 1 including contacting said treated formation following said contact with said aqueous treatment fluid with a hydrocarbon liquid solvent to remove said oil soluble resins.

7. The method as defined in claim 6 said hydrocarbon liquid is evenly oil.

8. The method as defined in claim 1 wherein said resins are evenly dispersed in a substantial portion of said aqueous treatment fluid employed to treat said formation during any one such treatment thereof.

9. The method as defined in claim 1 wherein said resins are dispersed in only a portion of said treatment fluid.

10. The method as defined in claim 1 wherein said aqueous treatment fluid is an acidizing fluid employed to solubilize a portion of said formation, said resins are substantially insoluble in said acidizing fluid, said friable resin has an average particle size ranging from about 0.5 to about 300 microns, said pliable resin ranges in size from about 0.05 to about 30 microns, and the total amount of both the friable resin and pliable resin in said acidizing fluid is sufficient to effectively divert at least a portion of said acidizing fluid from the more permeable portion of said formation to a less permeable portion of said formation.

* * * * *